W. J. DOUST, Jr.
TRUCK.
APPLICATION FILED JAN. 15, 1914.
1,149,639.
Patented Aug. 10, 1915.
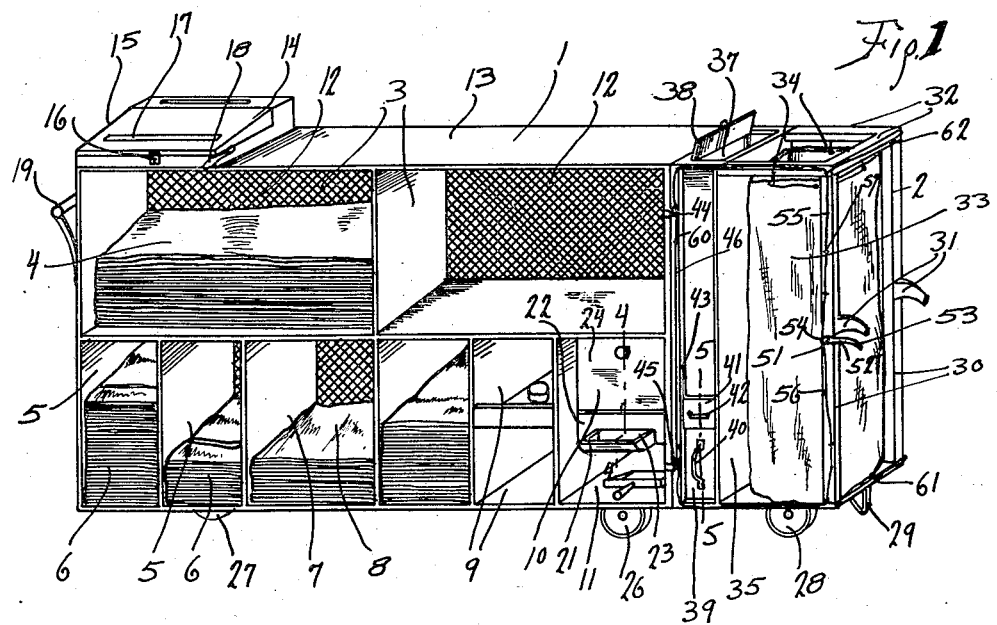
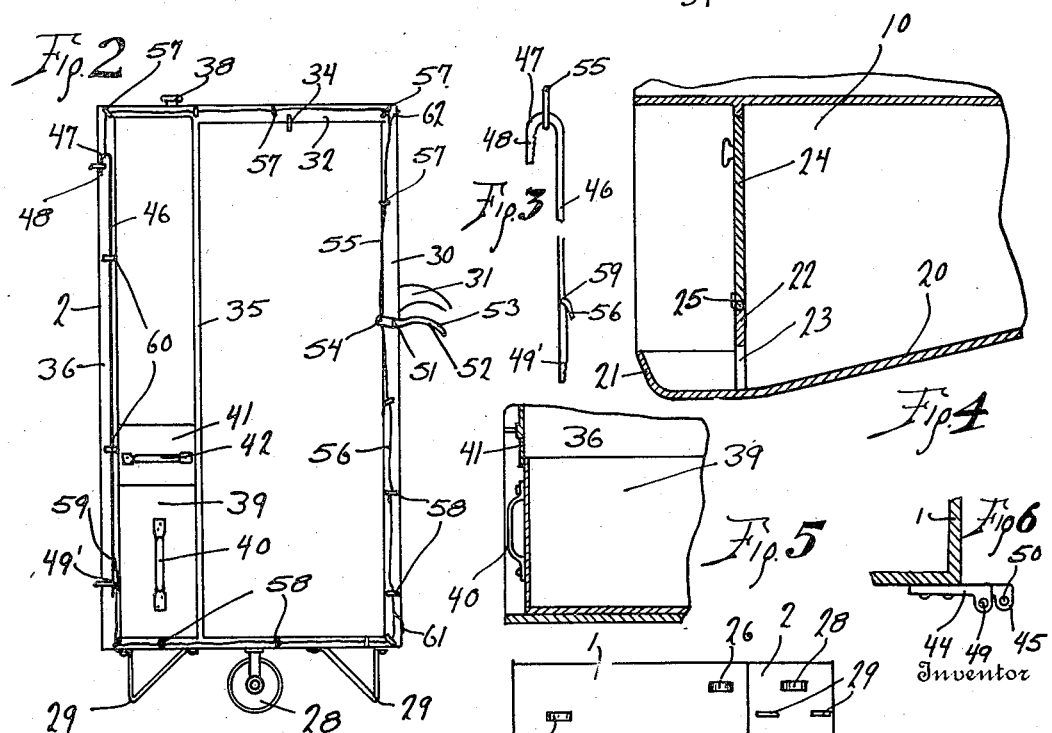
Witnesses
Harold Scantlebury
Edna Broyles
Inventor
William J. Doust, Jr.
By Herbert E. Smith Attorney

UNITED STATES PATENT OFFICE.

WILLIAM J. DOUST, JR., OF SPOKANE, WASHINGTON.

TRUCK.

1,149,639.

Specification of Letters Patent.  Patented Aug. 10, 1915.

Application filed January 15, 1914. Serial No. 812,357.

*To all whom it may concern:*

Be it known that I, WILLIAM J. DOUST, Jr., a citizen of the United States, residing at Spokane, in the county of Spokane and State of Washington, have invented new and useful Improvements in Trucks, of which the following is a specification.

The object of this invention is to provide a truck, which is especially designed for use in hotels and the like to facilitate the distribution of clean linen and the collection of soiled linen.

It is one of the objects of this invention to provide a truck in two sections, each of which is provided with wheels or the like whereby it may be advanced, separately, and wherein coupling means is provided for coupling the sections together when it is desired to move both of them about.

A further object is to provide a truck in two sections, each having wheels, and to provide coupling means which is so disposed and arranged that it will couple the sections together in such a manner that the strain imposed upon the coupling means will be merely that of holding the sections in coupled relation.

Other features and objects of the invention will be more fully described in connection with the accompanying drawing, and will be more particularly pointed out and ascertained in and by the appended claims.

In the drawing, Figure 1 is a perspective view of a truck embodying my invention and showing the clean and soil sections coupled together. Fig. 2 is a view in side elevation of the soil section detached. Fig. 3 is a contracted view in elevation of a portion of the coupling means for uniting the clean and soil truck sections. Fig. 4 is a sectional view on line 4—4 of Fig. 1. Fig. 5 is a sectional view on line 5—5 of Fig. 1. Fig. 6 is a horizontal sectional view through a portion of one corner of the clean section, illustrating one of the coupling members. Fig. 7 is a bottom plan view, illustrating the disposition of the bearing wheels on the united sections.

Like characters of reference designate similar parts throughout the different figures of the drawing.

As illustrated, 1 designates the clean section and 2 designates the soil section, and both are substantially rectangular in form and are provided with upright walls adapted to be united in flat abutting relation, First, referring to the clean section 1, I divide the same into suitable compartments for receiving and holding clean linen, the particular arrangement shown including compartments 3 for sheets 4, compartments 5 for towels 6, and compartment 7 for pillow slips 8. Compartments 9 serve for miscellaneous articles of employment by the user, and a closed compartment 10, hereinafter more fully described, may serve for containing soap. Beneath the soap container 10 is a compartment 11, which may serve for a dust pan. As will be seen by reference to Fig. 1, I construct the clean truck section so that the same opens laterally on one side and I close the other side by a suitable netting 12.

On the top 13, I mount a desk structure 14 which may serve as a writing rest on which the record of the operator's work may be made from time to time. The desk is provided with a hinged portion 15, which may be secured by a suitable lock 16, so that records of the amount of service performed may be deposited by the operator in the desk through a suitable slot 17. If desired, I may provide a non-return web mechanism on which the record may be kept and which may be operated by mechanism controllable by a crank 18, but inasmuch as this mechanism does not form an essential part of this invention I have not shown the same in detail. A handle 19 is disposed at the rear of the clean section 1 to be grasped by the operator.

The clean section 1 is provided with the soap compartment 10, hereinbefore referred to, and the same is provided with a downwardly and outwardly inclined bottom wall 20, which terminates in a trough 21. A front wall 22 provided with an opening 23, limits gravity discharge into the trough 21 in a manner which will be clear by reference to Fig. 4. I provide the soap compartment 10 with a hinged front door 24, which may be retained in a closed position by a spring 25. The door serves the purpose of opening the compartment when it is desired to charge the same with soap.

The clean section 1 is provided with bearing wheels 26, whose sides are maintained in parallel relation with the sides of section 1. A swiveled caster wheel 27 may be provided at the rear of section 1.

Next referring to the soil section 2, I mount the same on wheels 28, which are substantially centrally disposed with respect to the front and back of the section, and forwardly and rearwardly of the wheels 28 I provide supports 29 in the form of brackets either of which may function as a rest to limit tilting movement of the soil section 2 when the same is uncoupled from the clean section 1 and is in a position of rest. The forward portion of the soil section 2 comprises an open framework including uprights 30 on which I mount hand grips 31 for independent advancement of the soil section. The uprights 30 are connected by top frame rails 32 from which I suspend a container or bag 33 for soiled linen by means of fastening devices 34. Rearwardly of the container 33 I dispose a wall 35 which forms with a rear wall 36 a chute-like sweepings container into which sweepings may be deposited from a dust pan through an open top 37. I close the open top with a door 38 to prevent escape of the contents of the sweepings container. A drawer 39 may serve to catch the sweepings and may be withdrawn by means of a hand grip 40. A slide 41 provided with a hand grip 42 mounted to slide in grooves 43 may serve to retain the drawer in position.

I will next refer to the improved coupling means whereby the sections may be coupled together. Extending from section 1 are coupling members 44 and 45, the former being above the latter and the members being duplicated on the opposite side of the section. The coupling members 44 and 45 extend sufficiently forwardly of section 1 so as to provide guides adapted for engagement with the sides of section 2 to guide the latter into proper coupling relation with the former. A coupling rod 46 is provided for each pair of coupling members and the upper end is hooked shaped, as indicated at 47 and is provided with a depending coupling shank 48, which is shown slightly tapered or wedge-shaped for entrance into the opening 49 of coupling member 44. The lower end 49' is also wedge-shaped and is adapted for entrance into opening 50 of coupling member 45, the latter being somewhat longer than the former. By tapering the shanks 48 and 49, I render it possible to jam the coupling rod downwardly so that the wedge shanks will tightly couple the sections together so as to prevent lost motion and cause the sections to roll on their bearing wheels as a unitary structure.

I will next describe operating means which I may provide for my improved coupling device. I pivot to one of the uprights 30, at 51, a lever 52 having a suitable hand grip 53, on one end the remaining end of the lever being connected at 54 with the opposite ends of operating cords or wires 55 and 56. Cord 55 extends through eyelets 57, serving as guiding means and is connected with the upper hooked end 47, of the coupling rod 46. Operating cord 56 extends through guiding eyelets 58 and is connected with the lower end of coupling rod 46, as indicated at 59. The coupling rod 46 is slidably mounted upon the soil section 2 in guides 60. In order that the coupling rods 46 may be operated in unison, I extend an operating cord 61 from cord 56 and an operating cord 62 from cord 55, to the opposite coupling rod. The cords 61 and 62 are guided in the same manner as cords 55 and 56 and operate in the same way.

It will now be clear that when the hand grip 53 is elevated it will raise the coupling rods 46 out of coupling relation with coupling members 44 and 45, so that section 2 may be advanced between the opposite pairs of coupling members of the section 1. When the sections are in position, as shown in Fig. 1, hand grip 53 may be lowered to force the coupling shanks 48 and 49' into the coupling members 44 and 45 and a wedge coupling connection may be effected if sufficient stress is imposed in lowering 53.

I prefer in some instances to couple the sections together in such a manner that section 2 may be carried by section 1 so as to facilitate steering the truck, and in such instances, I may reduce the diameter of the caster wheel 27 so that the weight of section 1 may overbalance the weight of section 2 and raise the latter very slightly from the floor line on the fulcrum formed by wheels 26. However, in most instances there will be no difficulty in steering the truck even when section 2 rests upon its own bearing wheels.

It will now be seen that the clean truck may be stocked with linen greatly in excess of the capacity of the bag 33, for a corresponding amount of soiled linen, for a given number of rooms, and when the soil section has been filled, it may be detached and wheeled to a suitable point of deposition for the soiled linen and sweepings. It will be understood that a bag of sufficient capacity would be entirely too heavy to be carried by a female operative, and that the device of my invention facilitates transport of a stock of linen for a large number of rooms, thereby saving the operatives time in making successive trips and enabling one person to thereby perform a much greater amount of service.

While I have herein shown and described one specific form of my invention, I do not wish to be limited thereto except for such limitation as the claims may import.

I claim:—

1. In a laundry or like truck, two wheeled sections, one thereof having fixed coupling members on opposite sides thereof provided with openings, the other of said sections having slidably mounted coupling rods provided with wedge-shaped coupling shanks for entrance into said coupling openings, substantially as described.

2. In a laundry or like truck, two wheeled truck sections, one thereof having fixed coupling members, a slidably mounted coupling rod on opposite sides of the remaining truck section, operating cords for said coupling rods, and a lever connected with said cords for operating said rods simultaneously into or out of coupling relation with respect to said coupling members, substantially as described.

3. In a goods transporting truck structure, a relatively long truck provided with a pair of bearing wheels near one end thereof and a caster wheel near the other end thereof, a section of relatively short lengths with respect to the long section and provided with wheels, and means for coupling the short section to that end of the long section remote from the caster wheel end to unite the trucks to dispose the weight thereof on the wheels of the longer section, substantially as described.

4. In a laundry or like truck, a pair of wheeled sections each having coupling members on opposite sides thereof, and means on one section for coupling and uncoupling the members of said sections to connect or disconnect the latter, substantially as described.

In testimony that I claim the foregoing as my own, I hereby affix my signature in the presence of two subscribing witnesses.

WILLIAM J. DOUST, Jr.

Witnesses:
   H. E. SMITH,
   EDNA BROYLES.